Dec. 4, 1945.  P. H. MEFFERD  2,390,444
COUNTING MECHANISM
Filed Nov. 7, 1942  3 Sheets-Sheet 1
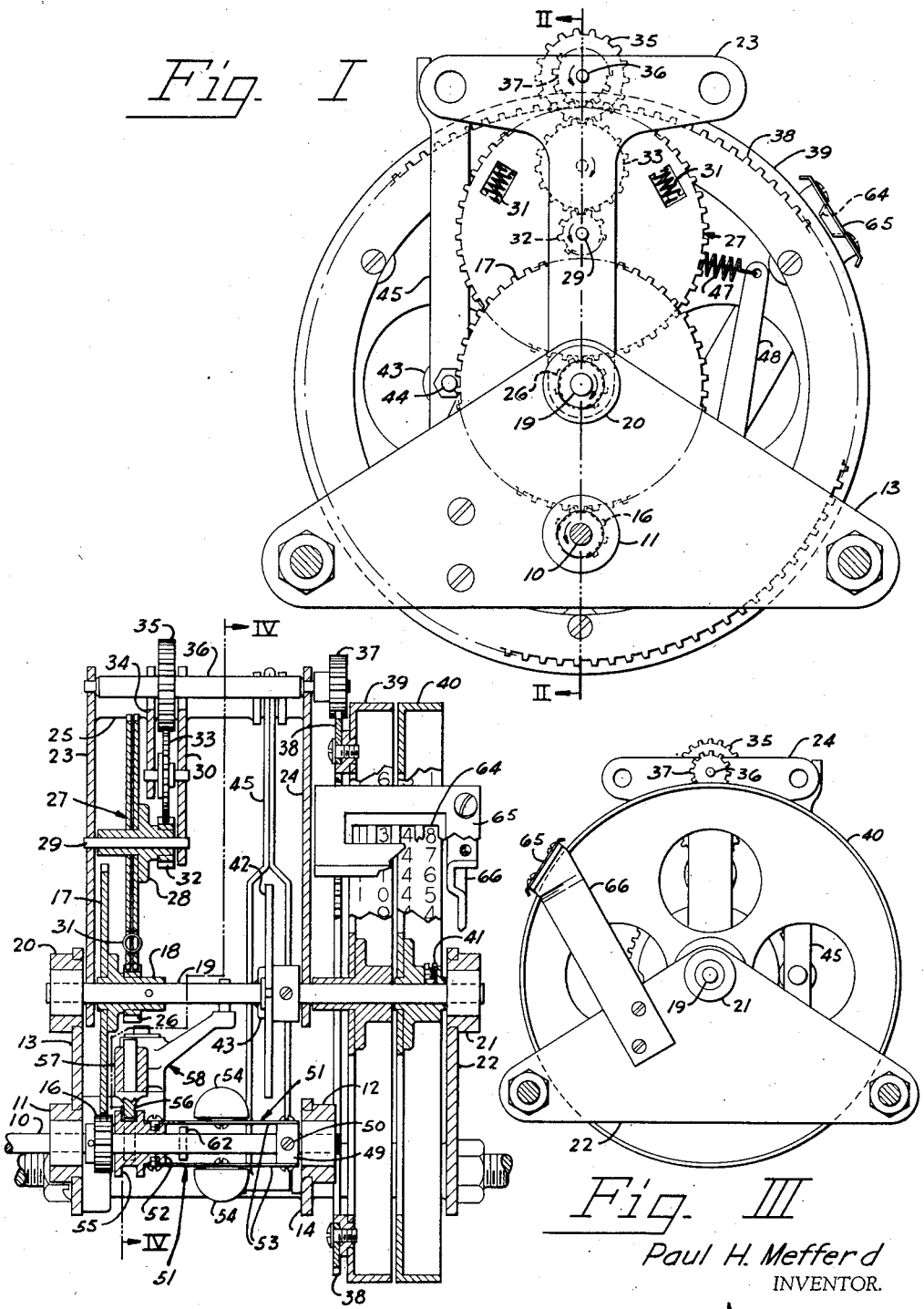
Paul H. Mefferd
INVENTOR.
BY Marshall & Marshall
ATTORNEYS Dec. 4, 1945.   P. H. MEFFERD   2,390,444
COUNTING MECHANISM
Filed Nov. 7, 1942   3 Sheets-Sheet 2
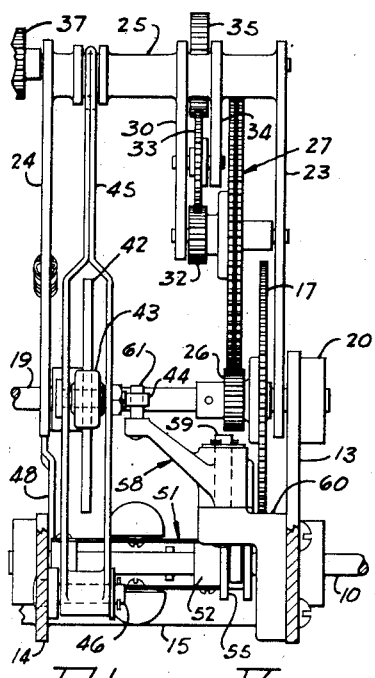
Fig. V
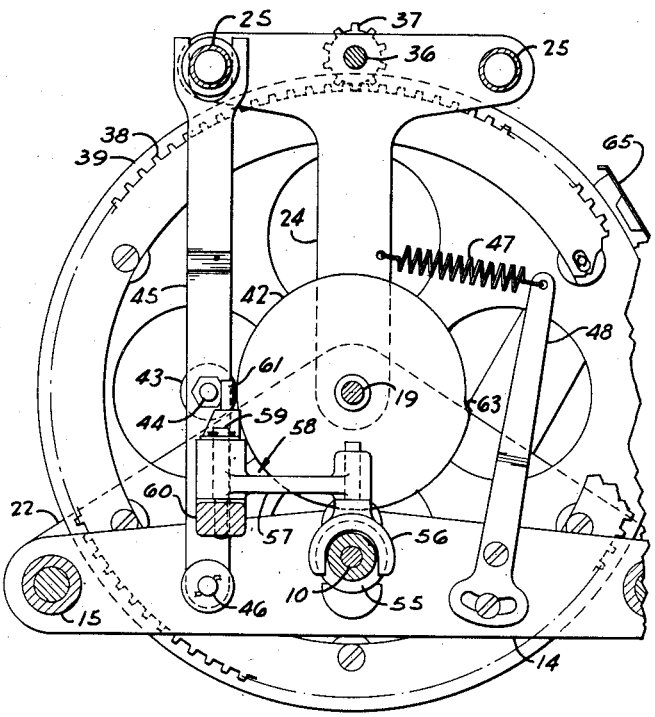
Fig. IV
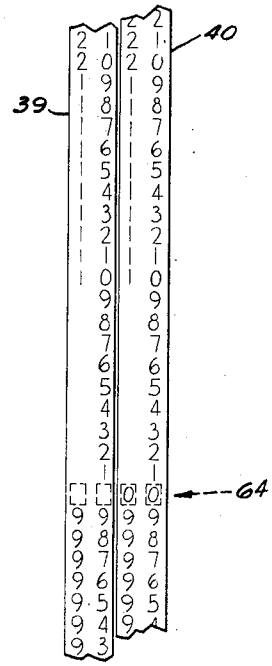
Fig. VII
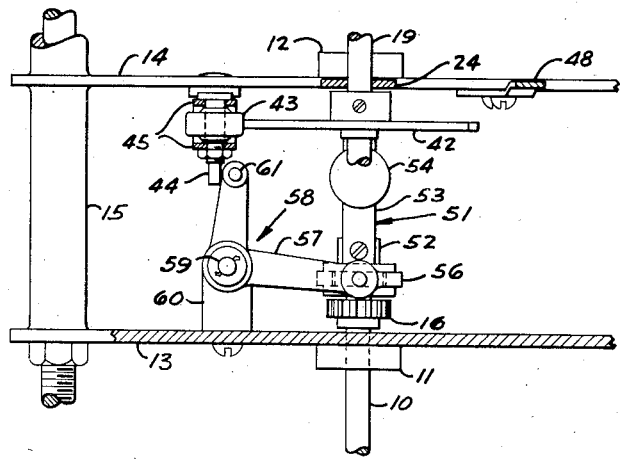
Fig. VI
Paul H. Mefferd
INVENTOR.
BY Marshall & Marshall
ATTORNEYS

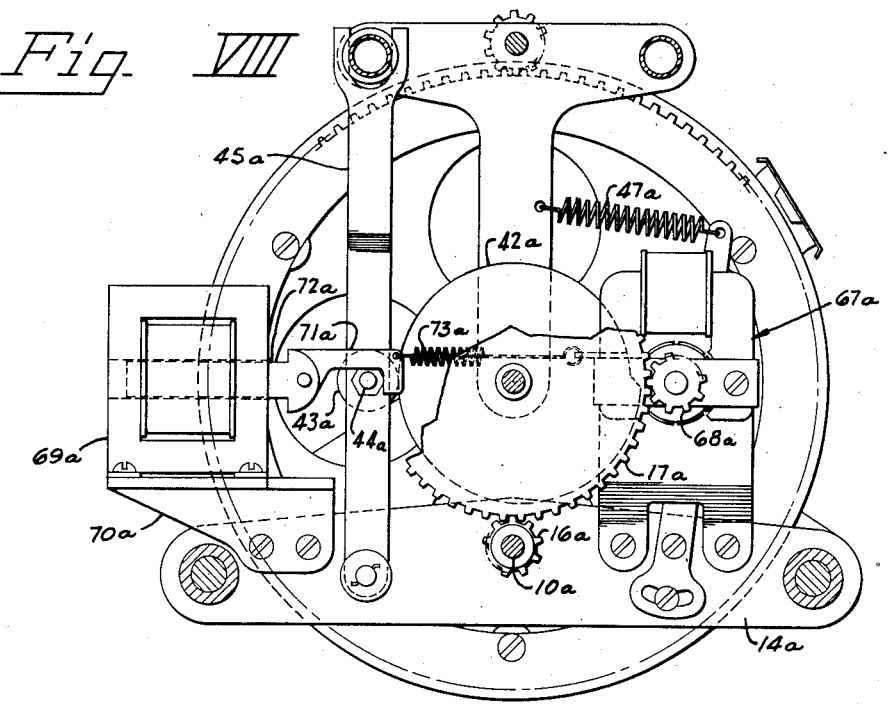
Fig. VIII
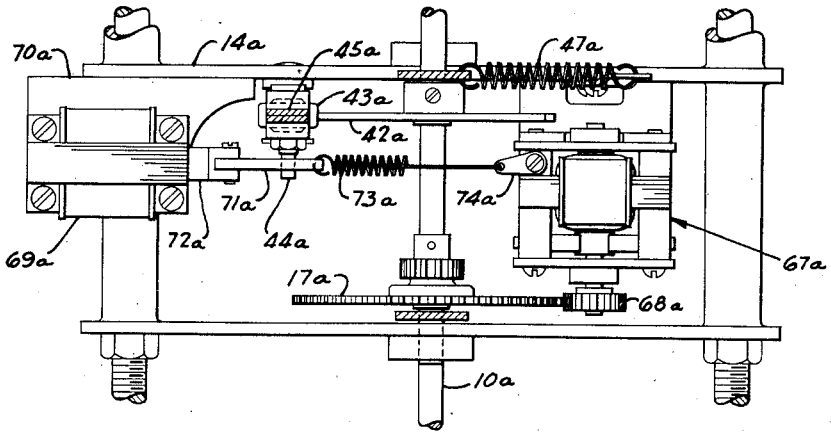
Fig. IX
Paul H. Mefferd
INVENTOR.
BY Marshall & Marshall
ATTORNEYS Patented Dec. 4, 1945

2,390,444

UNITED STATES PATENT OFFICE 2,390,444

COUNTING MECHANISM

Paul H. Mefferd, Toledo, Ohio, assignor to Toledo Scale Company, Toledo, Ohio, a corporation of New Jersey Application November 7, 1942, Serial No. 464,842

5 Claims. (Cl. 235—136)

This invention relates to counting mechanisms having drums or dials bearing figures in series of decimal places, such as units, tens and hundreds.

Such counting mechanisms for the most part may be classified into two different types. One of these is the direct gear driven type of counter wherein one counting drum, for example, the units drum, is geared to the tens drum by gearing having a reduction of ten to one and the tens drum is geared to the hundreds drum by similar gearing, etc. Counters of this type have two disadvantages. If the number to be counted is, for example 555, when the mechanism stops the hundreds indicator will be halfway between the "5" and "6" positions and the tens indicator will be halfway between the "5" and "6" positions. A familiar example of this type of counting mechanism having movable pointer indicators geared together is the ordinary electric meter in reading which it is customary, whenever an indicator points to the space between two figures, always to read the larger figure, or always to read the smaller figure. This, of course, gives accurate results in the long run; but, if the wrong figure were read by mistake, the particular reading would be inaccurate. A second serious disadvantage with the gear driven counter is the fact that at even moderate speeds of operation, since the counting wheels are in constant motion, the figures cannot be read at all.

A second type of counting mechanism is the so-called "transfer" type in which the units drum only is rotated at constant speed, the tens and hundreds drums being moved intermittently. For each revolution of the units drum in this type of counter there is a "carry-over" of one increment to the tens drum, and similarly for each rotation of the tens drum a "carry-over" of one increment to the hundreds drum. This type of mechanism eliminates the difficulty in reading the tens and hundreds drums since they are moved from position to position instantly at the time of "carry-over." Because the tens and hundreds drums must be accelerated from standstill to the speed of the units drum and decelerated to zero while the units drum is moving 1/10 of a revolution, the speed of operation of this type of counter is limited to that speed at which the transfer mechanism can withstand the acceleration forces involved. These mechanisms can not be built strong enough to withstand the extreme acceleration forces produced during high speed operation and any attempt to operate at these speeds is sure to result in mechanical failure.

Because of the low speeds at which "carry-over" type counters must be operated to prevent destructive wear, gear type counters have been used for most tasks of counting where speed of operation is more important than ease and accuracy of reading. The operating limitations, inherent in both gear driven and "carry-over" type counters, have made it impracticable to use either type of such counters in connection with instruments the speeds of operation of which vary during their cycles of operations from extremely high speeds to very slow speeds and in which indications must be positive and not liable to be erroneously read because of intermediately positioned indicators.

Although both the direct driven and transfer type counters have certain limitations, if the good features of both could be combined, and the disadvantages of both eliminated, a counting mechanism capable of counting at extremely high speeds and yet of giving positive indication would result. It is, therefore, desirable to provide a counting device which operates as a gear driven mechanism at high speeds and as a transfer type mechanism at slow speeds. Some mechanism, preferably simple and foolproof, must be provided which will convert the operation of the counting mechanism from transfer to direct drive automatically. This mechanism must operate when the speed of the counting device becomes high enough to subject the transfer mechanism to destructive forces caused by the rapidity of its operation, and similarly when changing from high speed to slow speed operation, the mechanism must operate to change the counting device from direct to transfer operation when the speed falls below this danger point so that the indicia on the counting drums or dials can be read.

It is an object of this invention to provide automatic speed responsive means for changing the operation of a high speed counting device from transfer drive to direct drive or vice versa.

It is another object of this invention to provide automatic mechanism for changing the operation of a counting device from transfer drive to direct drive as its speed of operation becomes too fast for the transfer drive to operate without injury.

It is a still further object of this invention to provide a counting device operable by transfer mechanism at low speeds and by direct drive mechanism at high speeds, and equipped with mechanism for automatically and positively changing from one to the other, depending upon the speed of operation.

More specific objects and advantages are apparent from the description, in which reference is had to the accompanying drawings illustrating preferred forms of counting devices embodying the invention.

In the drawings:

Fig. I is a view, in elevation, of a counting device embodying the invention.

Fig. II is a vertical sectional view, taken substantially on the line II—II of Fig. I.

Fig. III is a view, in elevation, taken from the right side of Fig. II, and shown on a reduced scale.

Fig. IV is a fragmentary vertical sectional view, taken substantially on the line IV—IV of Fig. II.

Fig. V is a fragmentary view, in elevation, certain parts being broken away, taken from the left side of Fig. IV.

Fig. VI is a fragmentary plan view of the mechanism shown in Fig. V.

Fig. VII is a projection on the plane of the paper of the indicia borne by the counting drums.

Fig. VIII is a view, in elevation, certain parts being broken away, of a counting device incorporating a modification of the invention.

Fig. IX is a fragmentary plan view of the mechanism shown in Fig. VIII.

These specific drawings and the specific description that follows merely disclose and illustrate the invention and are not intended to impose limitations upon the claims.

The output shaft of any machine with which it is desired to use a counting device embodying the invention is drivingly connected to an input shaft 10 of the counting device. The input shaft 10 is journaled in a pair of bushings 11 and 12 which are staked in a triangular frame member 13 and a cross frame member 14 respectively, which are welded to a pair of tubes 15 forming the main frame of the counting device.

A pinion 16 is pinned on the input shaft 10 and is in mesh with a gear 17 mounted on a hub 18, in turn pinned to a main shaft 19 journaled in two bushings 20 and 21 which are staked in the upper corners of the triangular frame member 13 and a similar frame member 22. Two T-shaped plates 23 and 24 are welded to a pair of tubes 25, located at the ends of the cross arms of the T shaped plates, the structure thus formed being rockingly mounted on the main shaft 19 at the lower ends of the vertical members of the plates.

A pinion 26, which is secured on the hub 18, is in mesh with a pair of twin gears 27 mounted on a hub 28 which is journaled on a pin 29 mounted in the body of the T shaped plate 23, and a bracket 30 located between the T shaped plates 23 and 24 and welded to the tubes 25. The twin gears 27 are of the anti-backlash type, there being three small springs 31 directed between opposing shoulders of the two gears. Also mounted on the hub 28 is a pinion 32 which is in mesh with an idler gear 33 journaled by the bracket 30 and a similar bracket 34, the idler gear in turn being in mesh with a gear 35 mounted on an upper shaft 36 journaled at the center of the cross arms of the T shaped plates 23 and 24 parallel to the main shaft 19. A small pinion 37, secured to one end of the shaft 36, is in mesh with an annular gear 38 bolted on one side of a hundreds drum 39 which is rotatably journaled on the main shaft 19. A tens and units drum 40 is mounted on the shaft 19 adjacent the drum 39 but is secured to the shaft 19 by a set screw 41. Also secured on the shaft 19 is a cam 42, the periphery of which is engaged by a roller 43 journaled on a pin 44 which extends through the legs of a forked rocker arm 45. The lower ends of the legs of the arm 45 are mounted on a pin 46 which is riveted to the cross frame member 14 parallel to the main shaft 19. The upper end of the rockable frame 45 is bifurcated and engaged with one of the tubes 25 connecting the T shaped plates 23 and 24. A spring 47 is hooked between the T shaped plate 24 and an arm 48 adjustably mounted on and extending upwardly from the cross frame 14.

A collar 49 (Fig. II) is secured to the input shaft 10 by means of a set screw 50. Two flexible resistance members 51 connect the collar 49 to a second collar 52 which is loosely mounted on the shaft 10. Each of the resistance members 51 comprises a ribbon 53 and weight 54. The collar 52 has an annular slot 55 in which is engaged a fork 56 (see also Fig. IV) swivelably mounted in one end of an arm 57 of a bell crank 58 which is mounted on a vertical pin 59 extending upwardly from a bracket 60 secured to the inner side of the triangular frame member 13. The other arm of the bell crank 58 carries a short vertical pin 61 which is engageable with the end of the pin 44. A pin 62 extends through the shaft 10 between the collar 49 and the rest position of the collar 52.

When the input shaft 10 is rotated (for example, in a counterclockwise direction as shown by the arrow in Fig. I) at a low speed, the pinion 16 rotates the gear 17, shaft 19, tens and units drum 40 and the pinion 26 in a clockwise direction. The pinion 26, through the train of gears comprising the twin gears 27, pinion 32, idler gear 33 and gear 35, rotates the shaft 36 and pinion 37 in a counterclockwise direction. This in turn drives the annular gear 38 and the hundreds drum 39. The cam 42, which is rotated in unison with the units and tens drum 40, has one short abrupt step 63 forming, in radians, one 1/100 of the circumference. This step 63 of the cam 42 is positioned with respect to the units and tens drum 40 so that it passes the roller 43 of the rockable frame 45 as the "99" indicium on the drum 40 (Fig. VII) moves by a window 64 in a viewing frame 65 mounted on a bracket 66 which is secured to the triangular frame member 22. During the accumulation of value from "0" to "99," the cam is rotated and the roller 43 travels from the lowest point on the cam to the highest. This rocks the frame 45 to the left (Figs. I and IV), pulling the T shaped plates 23 and 24 to the left and bodily moving the pinion 37 in a counterclockwise direction around the annular gear 38. Inasmuch as the pinion 37 is rotating in a counterclockwise direction, this backs up the pinion on the gear 38 and no net motion is imparted to the gear 38 or to the hundreds drum 39. Thus as the value from "0" to "99" is accumulated, the ones and tens drum 40 rotates and the indicia carried thereby move downwardly past the window 63 but the hundreds drum 39 remains stationary. The rocking movement of the frame 45 and the T shaped plates 23 and 24 to the left is resisted by the spring 47 which, when the abrupt step 63 passes the roller 43, sharply pulls the rockable members to the right, bodily advancing the pinion 37 in a clockwise direction and moving the gear 38 and hundreds drum 39 1/100 of their circumference in a clockwise direction (Figs. I and IV). This advances the hundreds drum from one of the indicia on its periphery to the next.

Thus at slow speeds the hundreds drum remains stationary during the accumulation of 99/100 of the smallest increment which is indicated by the indicia it bears, being moved by the transfer of value accomplished by the cam 42.

It should be explained that the indicia borne by the drums 40 and 39 need not have the relation shown in the drawings. In other words, if it is desired to count by minor increments other than one, the mechanism may be adapted to do so by relatively simple changes. In the device shown the gear ratio between the input shaft 10 and the main shaft 19 is 1:5 and thus it requires five revolutions of the input shaft to rotate the units and tens drum once. The gear ratio between the units and tens drum 40 and the hundreds drum 39 is 100:1 so that one revolution of the units and tens drum is the equivalent of 1/100 revolution of the hundreds drum 39. For this reason the cam 42 has only one step, it being necessary to advance the hundreds drum 39 only one increment for each rotation of the tens and units drum 40. If it were desired to count by minor increments of five, for example, the gear ratio between the main shaft 19 and the hundreds drum 39 would be 1:20 rather than 1:100 and there would be five steps on the cam 42 and five series of indicia on the periphery of the drum 40, each series being "0, 5, 10, 15, etc., to 95." There would therefore be five transfers from the drum 40 to the drum 39 for each rotation of the drum 40.

When the speed of the counting device is increased to a point at which the transfer mechanism would be injured if permitted to operate, the flexible resistance members 51 are thrown outwardly, pulling the collar 52 toward the collar 49, until the collar 52 strikes the pin 62, and, through the medium of the bell crank 58 acting on the pin 44, moving the frame 45 and the rockable T shaped plates 23 to the left, thus disengaging the roller 43 from the surface of the cam 42. As long as the device continues to operate at high speed, the governor, made up of the flexible members 51 and their weights, will remain expanded and will hold the rockable members of the device at the left and the roller 43 out of engagement with the cam 42. Therefore, at high speeds there is no accumulation of the motion being transmitted through the gear train from the main shaft 19 to the hundreds drum 39 and the counter operates as a direct gear driven device. There is, therefore, nothing to retard the operation of the device and it can be operated at extremely high speeds without any injury to the mechanism.

When the device approaches the end of the "count" and its operation once more slows down, the lowering of the centrifugal force acting on th governor members allows the collar 52 to move back to its initial position, swinging the bell crank 58 out of the way and allowing the spring 47 to pull the rockable elements of the device to the right, thus re-engaging the roller 43 with the periphery of the cam 42. This engagement instantly stops the continuous motion of the hundreds drum 39 and the transfer mechanism actuated by the cam starts to accumulate movement transmitted by the gear train, this movement being applied to the hundreds drum at the transfer point only.

Figs. VIII and IX illustrate a modification of the invention in which a small generator 67a which is mounted on a cross frame member 14a controls the change from transfer drive to direct drive. A pinion 68a, which is secured to the shaft of the generator 67a, is in mesh with a gear 17a driven by a pinion 16a located on an input shaft 10a of the counting device. A solenoid 69a is mounted on a bracket 70a secured to the cross frame member 14a, being electrically connected to the generator 67a. A hook 71a is connected to a core rod 72a of the solenoid 69a and is engageable with the end of a pin 44a which extends through the arms of a rockable frame 45a and journals a roller 43a therebetween. A spring 73a is stretched between the hook 71a and a spring tab 74a secured to the frame of the generator 67a.

As is explained above, with reference to the embodiment of the invention disclosed in Figs. I through VII, when the device is operated at low speeds the frame 45a is rocked by means of the engagement of a cam 42a with the roller 43a to effect transfer from one of the drums of the counter to the other. As the speed of the counter increases to that point where the rapidity of oscillation of the frame 45a would be injurious, the generator 67a is also rotated at much higher speed and increases its output to the point where there exists sufficient flux in the solenoid 69a to cause it to overcome the resistance of the spring 73a and to pull its core rod 72a inwardly and, through the hook 71a and pin 44a, disengage the roller 43a from the periphery of the cam 42a. As long as the speed of the counter remains too high for operation through the transfer mechanism, the generator maintains the solenoid in this condition and the transfer mechanism is held inoperative.

The generator 67a is so designed that when the speed of the counter falls below the danger point, the generator no longer produces sufficient electricity to energize the solenoid 69a, and the spring 73a and a spring 47a swing the frame 45a and other rockable elements of the mechanism to the right, moving the roller 43a back into engagement with the cam 42a to make the transfer mechanism operative again.

The embodiments of the invention that have been disclosed may be modified to meet various requirements.

Having described the invention, I claim:

1. In a counting device having a plurality of indicia-bearing members, in combination, a transfer mechanism for indexing one of said members in accordance with a count accumulated on the next lower member, said mechanism comprising a gear train connecting said members, an oscillatable frame carrying part of said gear train, means for oscillating said frame in synchronism with the rotation of one of said members, the oscillation of said frame cooperating with uniform motion of said gear train to produce intermittent indexing motion of the higher order member, and means for rendering said oscillating means inoperative during high speed operation of said device.

2. In a counting device having a plurality of indicia-bearing members, in combination, a transfer mechanism for indexing one of said members in accordance with a count accumulated on the next lower member, said mechanism comprising a gear train connecting said members, an oscillatable frame for carrying part of said gear train, a cam rotating in synchronism with the lower order member for oscillating said frame and a speed responsive device for disengaging said frame from said cam during high speed rotation of said low order member.

3. In a counting device having a plurality of indicia-bearing members, in combination, transfer mechanism for indexing one of said members in accordance with counts accumulated on another of said members, said mechanism comprising an oscillatable frame carrying a planetary gear train drivingly connecting said members, a drive shaft for driving said gearing and said members, a cam driven by said shaft in synchronism with one of said members and engaged with said frame, linkage for disengaging said frame from said cam, a governor driven by said shaft, said governor having an element displaced during high speed operation, and a connection between said displaceable element of said governor and said linkage.

4. In a counting device having a plurality of indicia-bearing members, in combination, transfer mechanism for indexing one of said members in accordance with counts accumulated on another of said members, said mechanism comprising an oscillatable frame carrying a planetary gear train drivingly connecting said members, a drive shaft for driving said gearing and said members, a cam driven by said shaft in synchronism with one of said members and engaged with said frame, linkage for disengaging said frame from said cam, a solenoid, an element movable by said solenoid when energized, said element being connected to said linkage, and means for energizing said solenoid when the speed of operation of said counting device exceeds a preset limit.

5. In a counting device having a plurality of indicia-bearing members, in combination, transfer mechanism for indexing one of said members in accordance with counts accumulated on another of said members, said mechanism comprising an oscillatable frame carrying a planetary gear train drivingly connecting said members, a drive shaft for driving said gearing and said members, a cam driven by said shaft in synchronism with one of said members and engaged with said frame, linkage for disengaging said frame from said cam, a solenoid, an element movable by said solenoid when energized, said element being connected to said linkage, and a generator driven by said drive shaft and electrically connected to said solenoid for energizing said solenoid when the speed of operation exceeds a preset limit.

PAUL H. MEFFERD.